(12) United States Patent
Innes et al.

(10) Patent No.: US 10,371,910 B2
(45) Date of Patent: Aug. 6, 2019

(54) OPTICAL COMMUNICATIONS CABLES UTILIZING TOPOLOGICAL INSULATORS AS OPTICAL FIBER CORES

(71) Applicant: AT&T Intellectual Property I, L.P., Atlanta, GA (US)

(72) Inventors: Timothy Innes, Atlanta, GA (US); David Spivey, Jr., Smyrna, GA (US); Kevin Igoe, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/852,621

(22) Filed: Dec. 22, 2017

(65) Prior Publication Data

US 2019/0196123 A1 Jun. 27, 2019

(51) Int. Cl.
*G02B 6/44* (2006.01)
*G02B 6/04* (2006.01)

(52) U.S. Cl.
CPC ............. *G02B 6/4415* (2013.01); *G02B 6/04* (2013.01)

(58) Field of Classification Search
CPC .................................................. G02B 6/4415
See application file for complete search history.

(56) References Cited

U.S. PATENT DOCUMENTS

| | | | |
|---|---|---|---|
| 3,529,071 A | 9/1970 | Kafka | |
| 4,572,609 A | 2/1986 | Sakuragi et al. | |
| H383 H | 12/1987 | Skaritka | |
| 4,915,474 A | 4/1990 | Klein et al. | |
| 6,091,872 A | 7/2000 | Katoot | |
| 7,457,502 B2 | 11/2008 | Davis | |
| 9,024,415 B2 | 5/2015 | Zhang et al. | |
| 9,037,202 B2 | 5/2015 | Yuan et al. | |
| 2003/0206697 A1* | 11/2003 | Atkins | C03C 13/04 385/37 |
| 2006/0165358 A1 | 7/2006 | Trebst et al. | |
| 2011/0252798 A1 | 10/2011 | Allen | |
| 2013/0016022 A1* | 1/2013 | Heiks | G02B 6/4415 343/791 |
| 2016/0033406 A1 | 2/2016 | Ashrafi et al. | |
| 2017/0038123 A1* | 2/2017 | Strickland | F25D 19/00 |

FOREIGN PATENT DOCUMENTS

| | | |
|---|---|---|
| CN | 203102886 U | 7/2013 |
| CN | 103745768 A | 4/2014 |
| CN | 104377539 A | 2/2015 |

(Continued)

OTHER PUBLICATIONS

Liu et al., "Microfiber-based highly nonlinear topological insulator photonic device for the formation of versatile multi-soliton patterns in a fiber laser", May 15, 2015, Journal of Lightwave Technology, vol. 33, No. 10, pp. 2056-2061. (Year: 2015).*

(Continued)

*Primary Examiner* — Sung H Pak
(74) *Attorney, Agent, or Firm* — BakerHostetler

(57) ABSTRACT

An optical core made from at least on topological insulator microfiber. A cryogenic cooling layer surrounds the optical core. An insulative layer surrounds the cryogenic cooling layer. In one embodiment, the insulative layer comprises a layer of photonic crystal material.

20 Claims, 8 Drawing Sheets

(56) References Cited

FOREIGN PATENT DOCUMENTS

| CN | 204304213 U | 4/2015 |
| CN | 103472656 B | 11/2015 |
| KR | 2016-0079333 A | 7/2016 |
| KR | 2016-0109809 A | 9/2016 |
| RU | 2547343 C1 | 4/2015 |
| WO | WO 2001/033578 A1 | 5/2001 |
| WO | WO 2016/095858 A1 | 6/2016 |

OTHER PUBLICATIONS

Liu et al.; "Microfiber-Based Highly Nonlinear Topological Insulator Photonic Device for the Formation of Versatile Multi-Soliton Patterns in a Fiber Laser"; Journal of Lightwave Technology; vol. 33 No. 10; May 2015; p. 2056-2061.

Konopko et al.; "Transport Properties of Topolgical Insulator Bi0.83Sb0.17 Nanowires"; Cambridge Core; vol. 1785; Jan. 2015; p. 1-6; abstract only.

* cited by examiner

OPTICAL COMMUNICATIONS CABLES UTILIZING TOPOLOGICAL INSULATORS AS OPTICAL FIBER CORES

TECHNICAL FIELD

The technical field relates generally to optical communications and more specifically to optical communication cables.

BACKGROUND

Data networks face a continual escalation of traffic. Network traffic has grown exponentially over the last decades. Now, with the rise of machine-to-machine communication (e.g. IoT), one can expect that annual network traffic growth rates will continue to grow.

In today's modern transport network (i.e. the Internet), an optical transport network connects a plurality of IP packet routers, which comprise the "backbone" of the Internet. Optical client interfaces connect the IP packet routers, which currently offer connections of up to 100 Gbit/s over distances of around 40 km. From the client side, the optical transport network converts the short-reach client interface signal into long-reach signals, which travel over the optical transport network. These signals may travel thousands of kilometers, aided only by optical amplifiers and optical filters (for optical switching).

A problem exists in that over the years, IP packet router capacity and interface rates have grown at a faster rate than the capacity of the optical transport network. To keep pace, optical networks have employed optical parallelism, such as wave division multiplexing. However, it has become apparent that optical parallelism techniques are close to reaching their theoretical limit. With predictions of network traffic volume continuing its exponential increase, the foundation of ultra-fast internet (the optical network) will hit a network traffic bottleneck or congestion issue—otherwise known as the "capacity crunch" in the next decade. To overcome the capacity crunch, new materials and techniques are needed to increase the capacity of optical networks. The present disclosure addresses this need by providing embodiments of optical communications cables utilizing topological insulators as optical fiber cores.

SUMMARY

In one embodiment, a data transmission cable is provided. An optical core made from at least on topological insulator microfiber. A cryogenic cooling layer surrounds the optical core. An insulative layer surrounds the cryogenic cooling layer. In one embodiment, the insulative layer comprises a layer of photonic crystal material. In one embodiment, the photonic crystal material comprises a plurality of photonic crystal beads. In one embodiment, the at least one of the photonic crystal beads comprises a photonic crystal sphere. In one embodiment, the sphere comprises a sidewall surrounding a space defining a vacuum environment. In one embodiment, the sphere has a 25 micron inner diameter. In one embodiment, the sidewall of the sphere has a thickness of 5 microns. In one embodiment, the cryogenic cooling layer comprises at least one flexible tube defining a channel carrying a coolant. In one embodiment, the coolant comprises liquid nitrogen. In one embodiment, the optical core comprises at least one bundle of topological insulator microfibers. In one embodiment, the at least one bundle comprise a plurality of topological insulator microfiber elements. In one embodiment, at least one of the plurality of topological insulator microfiber elements comprises one of antimony, bismuth selenide, and bismuth telluride. In one embodiment, the at least one bundle further comprises a core of insulating flexible cold resistant plastic within which the topological insulator microfibers are embedded.

In one embodiment, a long-range data transmission cable is provided, which includes an optical core made from topological insulator microfiber and at least one heat exchange layer surrounding the optical core to provide a cryogenic environment for the optical core. In one embodiment, the at least one heat exchange layer comprises a coolant layer. In one embodiment, the coolant layer comprises at least one tube containing a coolant that is in thermodynamic communication with the optical core. In one embodiment, the coolant comprises liquid nitrogen. In one embodiment, the at least one heat exchange layer comprises an insulation layer. In one embodiment, the insulation layer comprises a photonic crystal layer. In one embodiment, the photonic layer comprises a plurality of photonic crystal spheres

BRIEF DESCRIPTION OF THE DRAWINGS

Aspects of the herein described optical communication cables are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
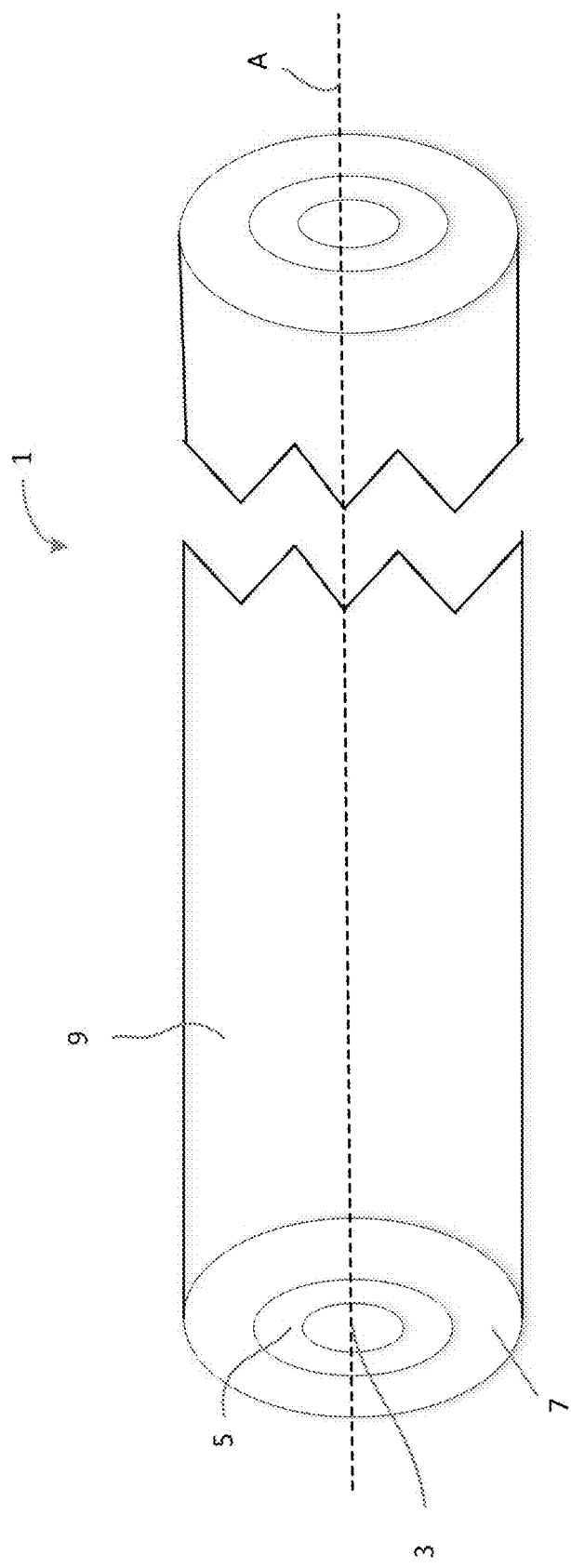
FIG. 1 is a perspective view of one embodiment of an optical communications cable.
Figure 2:
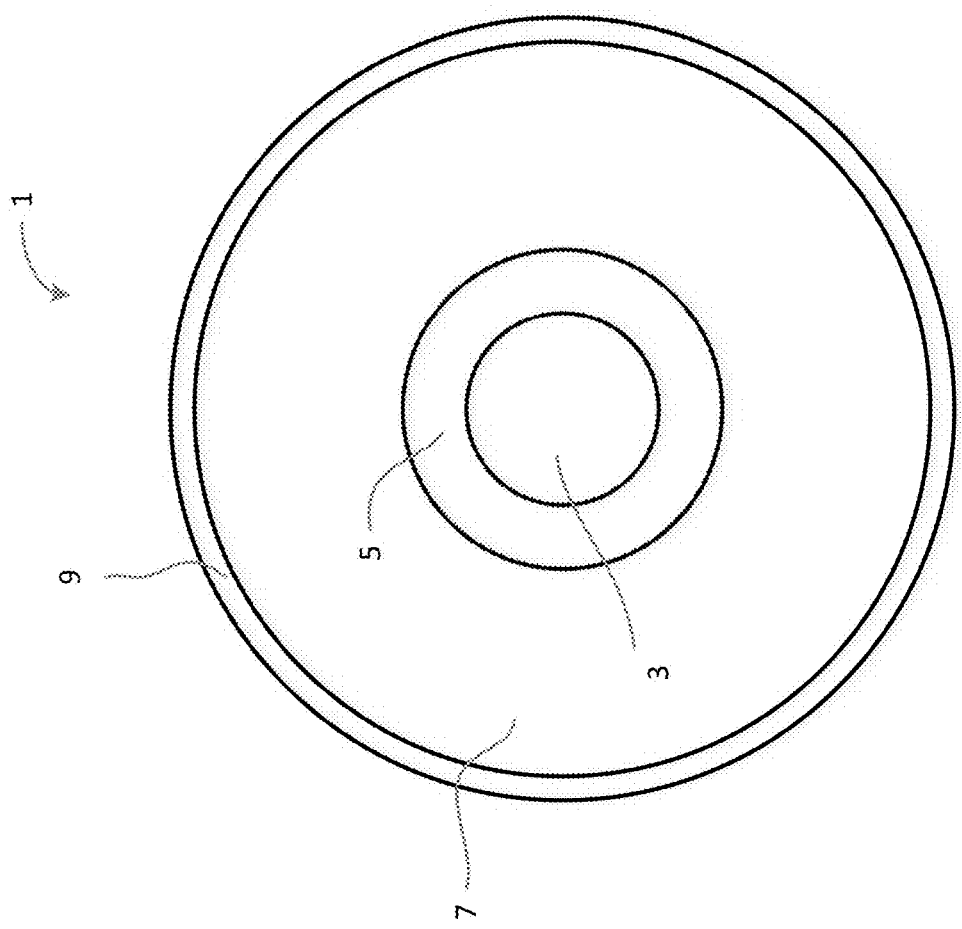
FIG. 2 is a front view of the optical communications cable of FIG. 1.

Referring to FIGS. 1 and 2, an exemplary embodiment of optical communications cable 1 is now shown for illustrative purposes. Cable 1 in one example is shown arranged such that it extends along an axis A. In the embodiment shown, cable 1 is cylindrical in shape with a circular cross-section. It should be noted, however, that this shape is provided for illustrative purposes only and other shapes are contemplated as being within the scope of this disclosure. For instance, cable could be square or rectangular in cross-section. Cable 3 includes a plurality of layers that are centered and extend axially along axis A.

In the embodiment shown, the layers of cable 3 include an optical core 3, a cooling layer 5, an insulating layer 7, and a jacket 9. Exemplary embodiments of the layers will be further described herein. It should be noted that layers may be added or removed without departing from the scope of this disclosure.

Optical core 3 in one embodiment comprises an optical fiber core. In one example, the optical core 3 is made from at least one topological insulator. Examples of such insulators include, but are not limited to, antimony, bismuth selenide, and bismuth telluride. In one embodiment, the topological insulator may comprise a plurality of topological insulator fibers. Such fibers may be arranged in a plurality of bundles to allow for multiplex communications. For instance, a plurality of topological insulator bundles may be utilized to support spatial division multiplexing over cable 1.

The employment of topological insulators in optical core 3 is useful because topological insulators have a property that allows photons to be bound to electrons in certain conditions. This coupling results in a particle that has properties of both a photon and an electron. Because topological insulators are insulating at their core, but are conducting at their surface, photons trace the surface of that insulator. Accordingly, the photons will follow a curved path or any other path into which the cable 1 is shaped. In contrast, conventional optical cable only allows photons to travel in straight lines unless reflection or refraction is used, which causes noise and signal loss. The use of topological insulators prevents such loss and noise. In addition, topological insulator fibers may be up to 20,000 times thinner than conventional optical fiber (e.g., a ratio of 200 microns: 0.01 microns=20,000). Accordingly, by replacing glass/plastic optical fibers with topological insulator fibers, an increase of network traffic by a factor of 20,000 by be achieved with the same size cable, thereby increasing optical network capacity.

Referring further to FIG. 2, cable 1 includes a cooling layer 5. Cooling layer 5 in one embodiment provides a cooling source for optical core 5. In one example, cooling layer 5 provides a cooling source that lowers the temperature of optical core 5 to less than 100 degrees Kelvin, thereby creating a cryogenic environment. Such a cryogenic environment creates the conditions by which the bonding of electrons and protons in the topological insulators of optical core 5 may occur.

Referring further to FIG. 2, in one embodiment, insulative layer 7 acts to block heat transfer from cooling layer 5. In one embodiment, insulative layer 7 may be constructed to block various types of radiation from causing heat transfer with respect to optical core 3. The following disclosure will provide various insulative schemes to limit various types of radiation. It should be noted that the insulation schemes provided in the present disclosure could also be applied to environments other than cable 1, such as technologies associated with quantum computing and photonic circuits. It should be noted that the particular insulation schemes should not be limited to the examples provided herein. It is envisioned that insulation schemes may change in accordance with the environment which cable is used. For instance, for cable used in an arctic environment, one or more insulation layers may be omitted if worthwhile.

Referring now to FIGS. 1 and 2, in one embodiment, cable 1 is surrounded by casing 9. Casing 9 in one example may be one or more layers of material designed to cooling layer 5 and insulative layer 7 against core 3. In one embodiment, casing 9 may also provide additional insulation. For instance, casing 9 may be made of a material to prevent heat transfer through conduction. An example of such a material includes, but is not limited to, super insulating aluminized Mylar.

Figure 3:
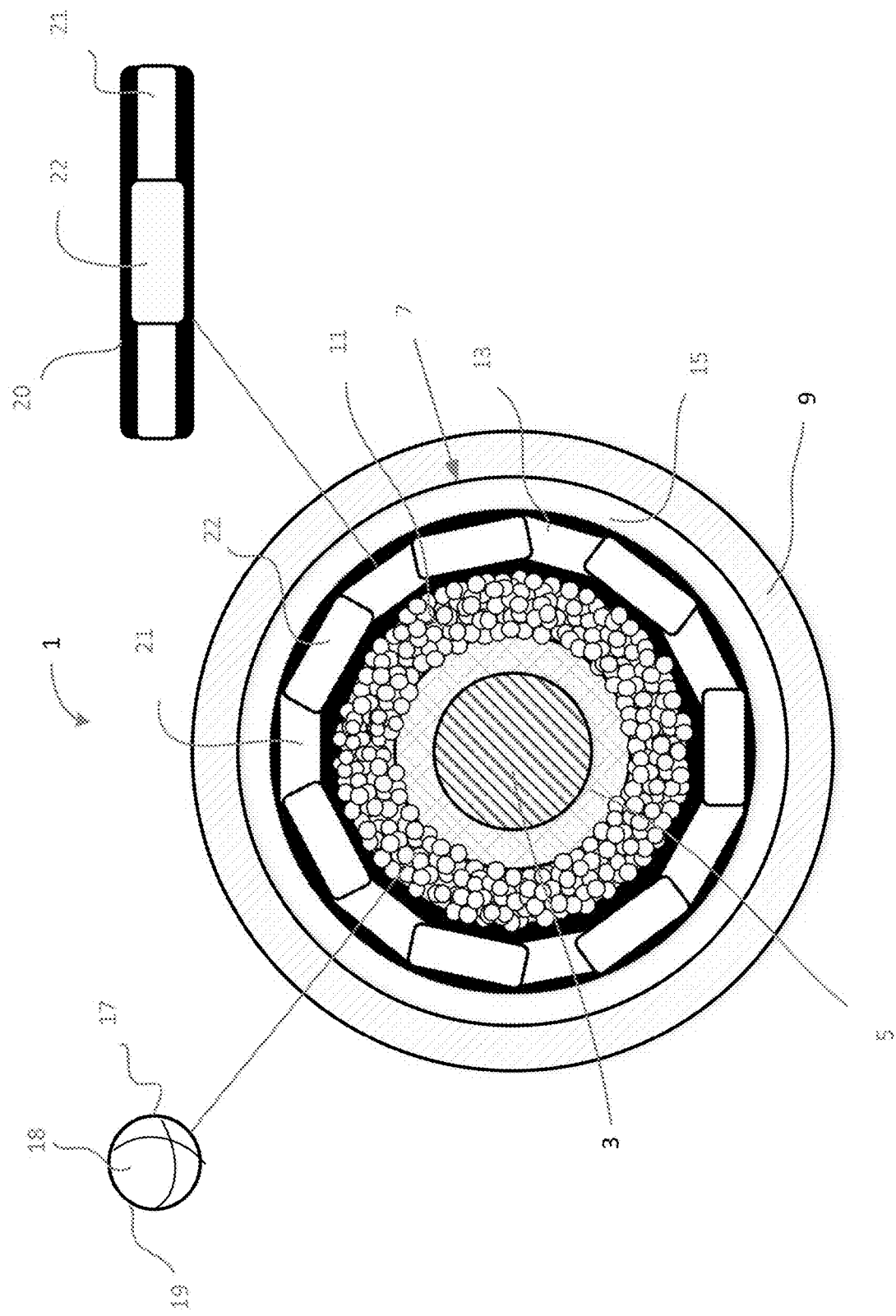
FIG. 3 is front view of an embodiment of the communications cable of FIGS. 1 and 2.

Referring to FIG. 3, an exemplary embodiment of cable 1 is now shown for illustrative purposes. In one embodiment, optical core 3 and cooling layer 5 are surrounded by an insulative layer that includes a photonic crystal bead layer 11, a silicone layer 13, and a silvering layer 15. These layers may be packed together around optical core 3 and held together through the force, perpendicular to axis A, that is provided by casing 9. In another embodiment, the layers may be bounded together through an adhesive compound.

Photonic crystal bead layer 13 is utilized to limit heat transfer due to radiation. In one example, photonic crystal bead layer 13 includes a plurality of photonic crystal beads 17. In general, photonic crystals comprise periodic bands of nanostructures that affect how light travels through them. For example, a 100 micron-thick stack of stacks of photonic crystal layers, each 1-micron thick and separated by 90-micron gaps of vacuum can reduce heat transfer by half that of a pure vacuum jacketed flask. Photonic crystals can be synthesized in such a way as to block electromagnetic radiation. The photonic crystal beads 17, shown in FIG. 3, are manufactured to encase a vacuum environment 18. In one example, the photonic crystal beads 17 are spheres having 5 micron thick walls 19 with a 25 micron inner diameter. In one example, the exterior of the photonic crystal beads 17 may include a two-micron thick coating of a transparent material such as Fluoropolyme. It should be noted that the prior numerical values for the wall thickness, diameter, and coating of photonic crystal beads 17 are provided for illustrative purposes only and other values are contemplated as being within the scope of this disclosure. Further, the spherical shape of photonic crystal beads 17 is provided for illustrative purposes only and other shapes are contemplated as being within the scope of this disclosure. One aspect of using spheres for the photonic crystal beads 17 is that when they packed into cable 1, the cable can still bend. Thus, they create an insulator that reduces heat transfer from conduction (the vacuum) and radiation (the photonic crystal) while still allowing the cable 1 to bend.

In one embodiment, silicone layer 13 includes a plurality of interlocking links 20. In one example, links 20 are made of silicone/flouorosilicone sheathed high performance plastic. In one example, each link comprises a connector portion 21 and a pocket portion 22. In one example, the pocket portion 22 comprises a space defined by silicone/flourosilcone, which is sealed as a vacuum. The connector portions 21 are comprised of solid silicone/flourosilcone and connect pocket portions 22 together in a linking fashion. The links 22 are then wrapped around the photonic crystal beads layer 17 and extend axially along cable 1.

Silvering layer 15 in one embodiment surrounds silicon layer 13 and is utilized to limit heat transfer from radiation. Silvering is a process for creating reflective surfaces (e.g. mirrors). In one example, silvering layer 15 may be provided through sputtering of aluminum onto silicon layer 15. Sputtering refers to the projection of energetic (i.e. electrically charged) gas ions onto another surface. In one example, the sputtering of aluminum may provide coverage of 3 to 5 aluminum layers, or a thickness of 429 pm to 715 pm (picometers).

Figure 4:
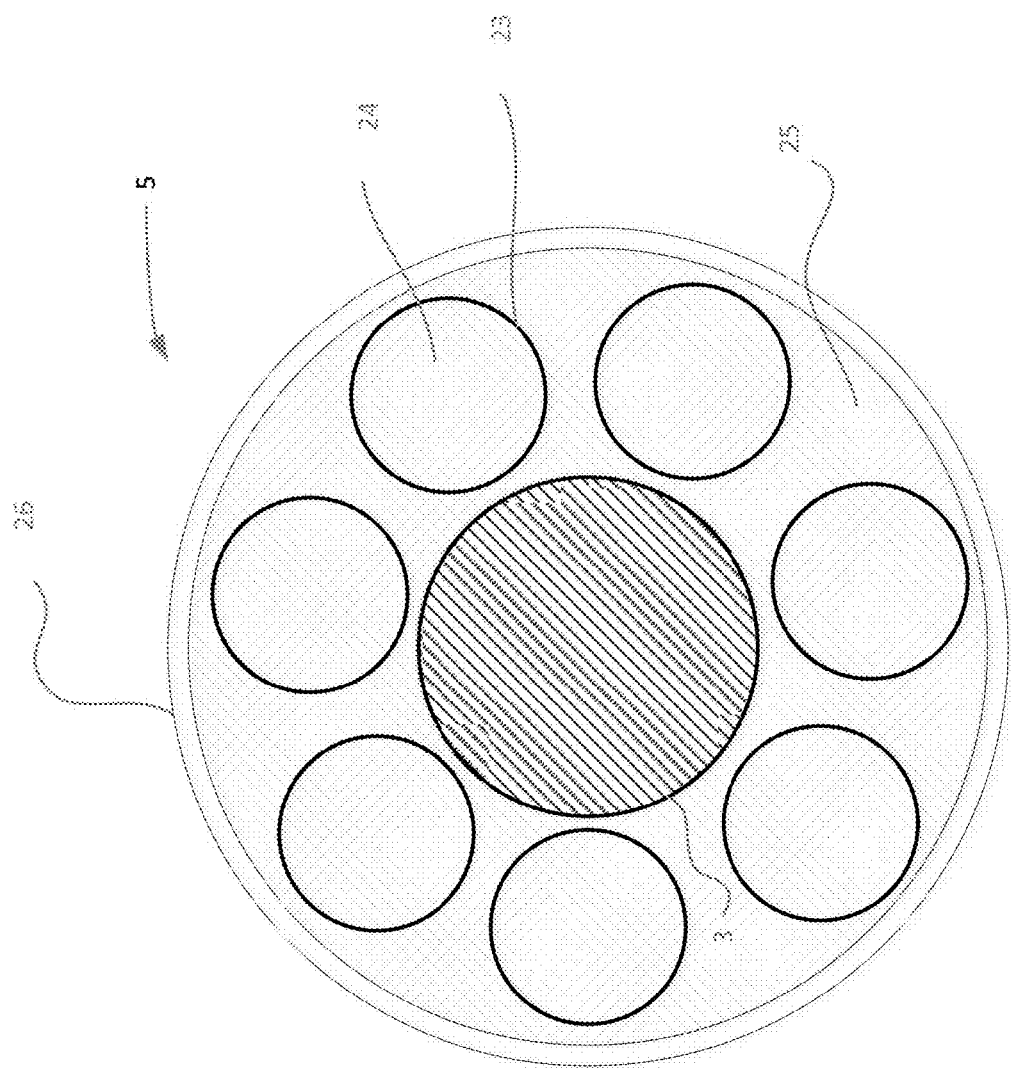
FIG. 4 is a front view of one embodiment of the cooling layer shown in FIG. 1.

Referring to FIG. 4, an exemplary description of cooling layer 5 is now provided for illustrative purposes. In one embodiment, cooling layer 5 comprises a plurality of conductive plastic flexible tubes 23. In one example, a tube 23 comprises a channel 24. A coolant, such as liquid nitrogen for example, may be provided in channel 24 to provide. The cooling tubes 23 will thermodynamically interact with optical core 3 those cooling it. The flexible plastic tubes 23 may be encased in a conductive plastic flexible foam material 25 to provide structure for cooling layer. In one embodiment, cooling layer 5 may be surrounded by a layer of insulation 26, such as a layer of super insulating aluminized mylar to reduce heat transfer through conduction. It should be noted that the shape, arrangement, and number of cooling tubes 23 are provided for illustrative purposes only and other configurations fit within the present disclosure.

Figure 5:
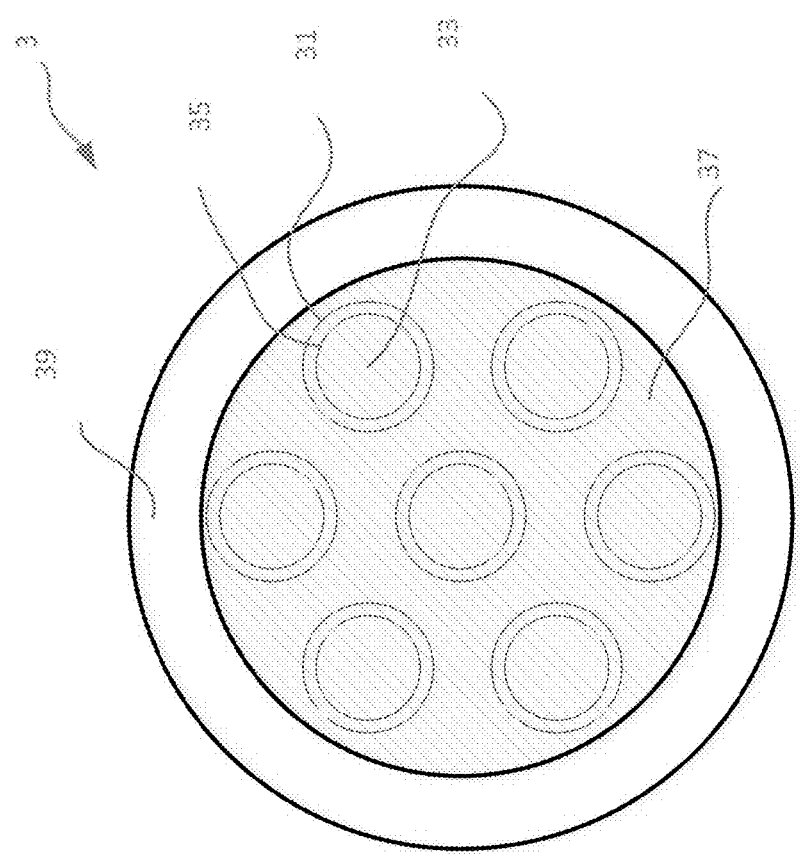
FIG. 5 is a front view of one embodiment of the optical core shown in FIG. 1.

Referring to FIG. 5, an exemplary description of optical core 3 is now provided for illustrative purposes. In one embodiment, optical core 3 comprises a plurality of microfiber bundles 31. An exemplary bundle 31 includes a bundle 33 of microfibers surrounded by a flexible insulating cover 35. In one example, the microfiber bundles 31 are surrounded by a flexible support foam 37 to provide the optical core 3 with structure. In one embodiment, a flexible conductive plaster layer 39 surrounds the optical core 3.

Figures 6, 7, 8:
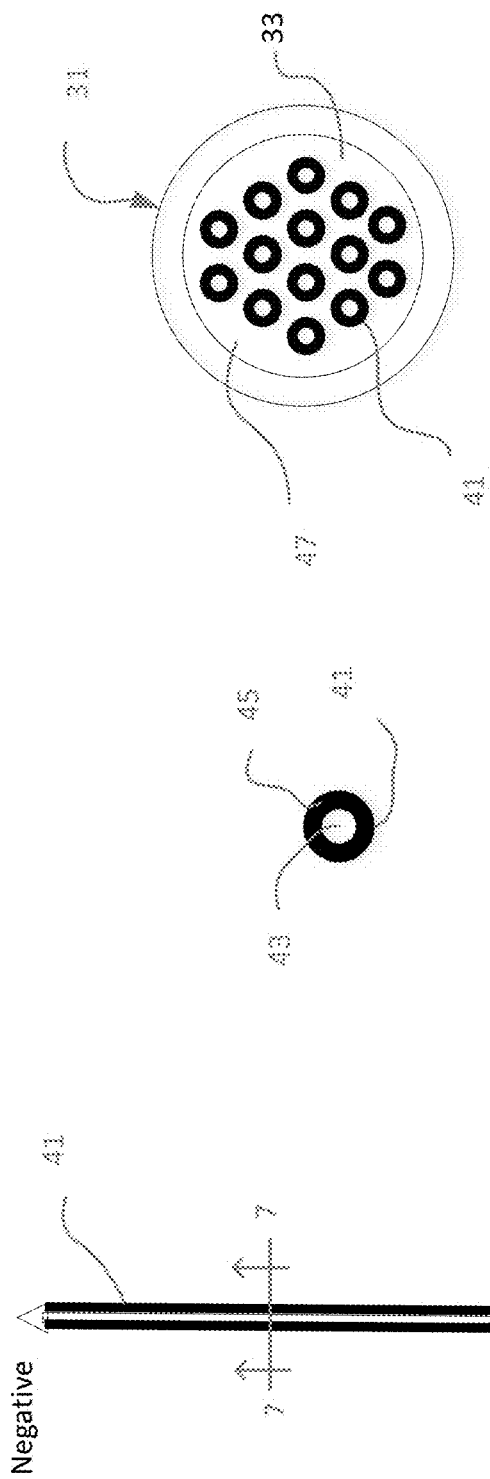
FIG. 6 is a top view of an exemplary topological insulator microfiber that may be used in the optical core shown in FIG. 5.
FIG. 7 is sectional view of the topological insulator microfiber of FIG. 6.
FIG. 8 is a sectional view of an exemplary microfiber bundle that may be used in the optical core shown in FIG. 6.

Referring to FIGS. 6-8, a further description of microfiber bundles 31 is now provided for illustrative purposes. In one embodiment, a microfiber bundle 31 comprises a plurality of microfiber structures 41. An exemplary microfiber structure 41 will have a positive voltage end and a negative voltage end (FIG. 6). Microfiber structure 41 in one example includes a topological insulator core 43 surrounded by a flexible insulating cold resistant plastic layer. An example of such a material is PEEK (polyetheretherketone), which is used for cryogenic applications and rated for liquid nitrogen. A plurality of microfiber structures 41 may be encased in flexible insulating cold resistant plastic 47. It should be noted that to provide duplex communication, the positive and negative ends of microfiber structures may be alternated within a bundle 31. In another example, a bundle 31 may include microfiber structures 41 oriented in the same direction and another bundle 31 may have microfiber structures 41 oriented in the opposite direction. It should be noted that the shape, arrangement, and number of microfibers 41 are provided for illustrative purposes only and that the scale will vary depending on the carrying capacity of the cable 1.

Figure 9:
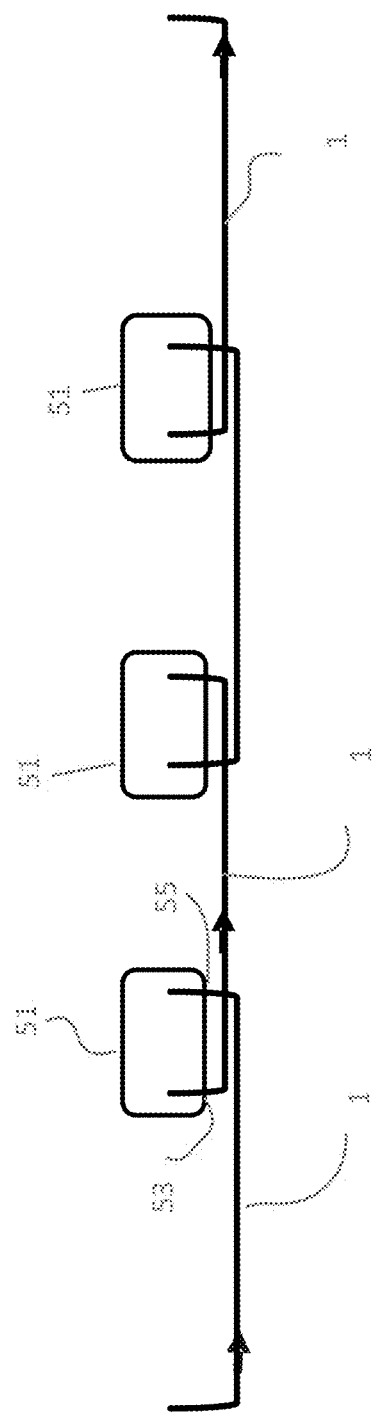
FIG. 9 is exemplary cooling system that may be used in conjunction with the optical communication cable of FIG. 1.

Referring to FIG. 9, an exemplary system for fueling cooling layer 5 is now described for illustrative purposes. In one embodiment, the system includes a plurality of cooling chambers 51. An exemplary cooling chamber 51 includes an outlet port 53 and an inlet port 55. Cables 1 may interface with cooling chambers 51 along a line of transmission. A coolant that is used by cooling layer 5 may be chilled in a cooling chamber. In one example, a coolant within cooling layer 5 that has reached an undesirable temperature may be drawn into cooling chamber through input port 55. The coolant may be chilled back to a desirable temperature and then reintroduced into cooling layer 5 through output port 53. In one example, the coolant may be pumped in and out of cable 1 via a pressure based system. When the coolant temperate reaches a threshold temperature (configured based off environmental and operational parameters), higher temperature coolant is replaced with colder temperature coolant. This is accomplished by forcing high pressure nitrogen gas into inlet port 55, and drawing out gas at outlet port 53. This method may use pressure gages to determine high and low pressure levels remain in a safe range, and gas pumps to facilitate the input/output gas line flow.

Figure 10:
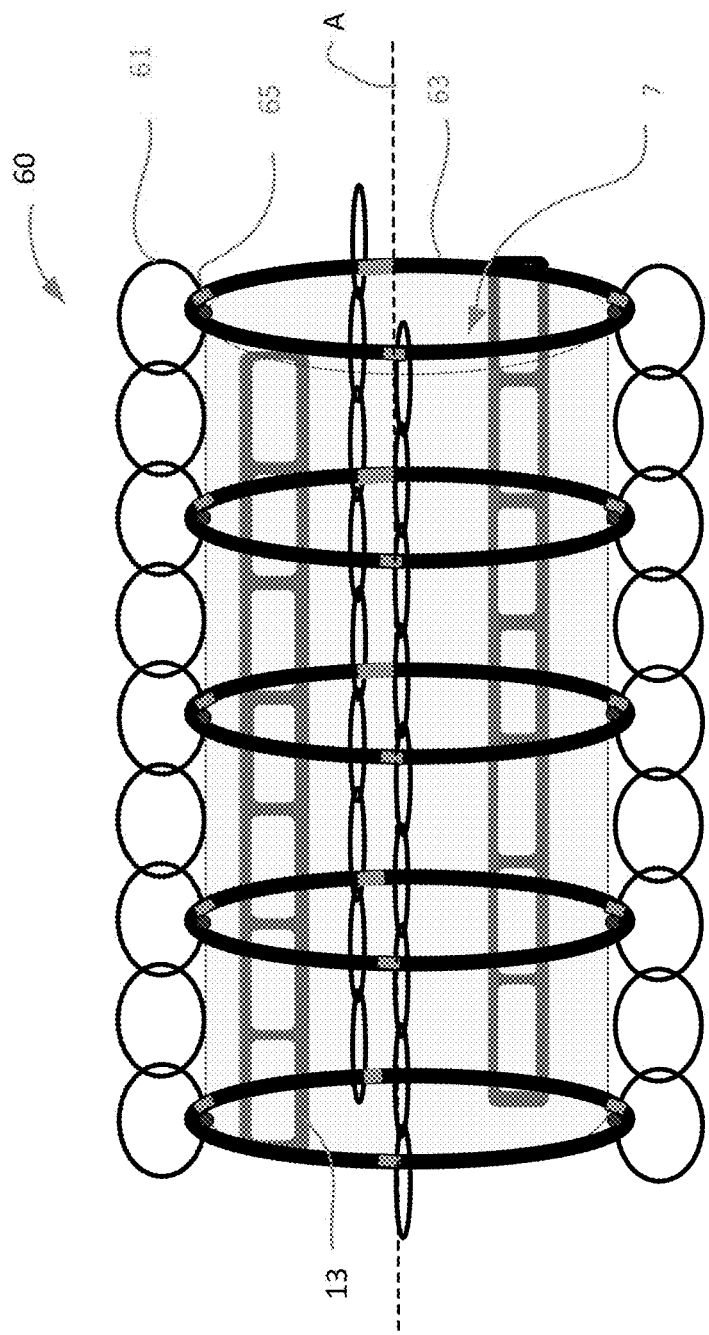
FIG. 10 is a perspective view of an exemplary support system that may be used the optical cable of FIG. 1.

Referring to FIG. 10, an exemplary support structure 60 for cable 1 is now provided for illustrative purposes. In one embodiment, support structure 60 includes a plurality of support rings 61 that link together as chain mail. In one example, support rings 61 may wrap around the axis A and be positioned between one or more layers of cable 1. In example, the axes of support rings 61 are transverse to the axis A of cable 1. The support rings 61 may extend along the axis of cable 1. In one example, the support rings 61 may be placed in between silicon layer 13 and silvering layer 15. In one embodiment, there are cross-sectional support rings 63 positioned at periodic intervals along the length of cable 1. The cross sectional support rings 63 may be coaxial with optical core 3 along axis A. The cross-sectional support rings 63 may be welded to support rings 61 at welding points 65. It should be noted that the illustrative diagram depicts four chains of support rings 61, but it should be understood that greater or lesser numbers of chains may be used. For example, support rings 61 may extend and over the entirety of the interior of cable 1 and thereby provide an interior metal jacket within the entirety of cable.

While an optical cable has been described in connection with the various examples of the various figures, it is to be understood that other similar implementations may be used or modifications and additions may be made to the described examples of a without deviating therefrom. Therefore, the optical cable described herein should not be limited to any single example, but rather should be construed in breadth and scope in accordance with the appended claims. One skilled in the art will recognize that an optical cable as described in the instant application may apply to many network environments and may be applied to any number of such devices connected via a communications network and interacting across the network.

The invention claimed is:

1. A data transmission cable, comprising:
    an optical core made from at least one topological insulator microfiber;
    a cryogenic cooling layer surrounding the optical core; and
    an insulative layer comprising a plurality of photonic crystal beads surrounding the cryogenic cooling layer.

2. The data transmission cable of claim 1, wherein at least one of the photonic crystal beads comprises a photonic crystal sphere.

3. The data transmission cable of claim 2, wherein at least one photonic crystal sphere comprises a sidewall surrounding a space defining a vacuum environment.

4. The system of claim 2 wherein the photonic at least one crystal sphere has a 25 micron inner diameter.

5. The data transmission cable of claim 4, wherein the sidewall of the at least one photonic crystal sphere has a thickness of 5 microns.

6. The data transmission cable of claim 1, wherein the cryogenic cooling layer comprises at least one flexible tube defining a channel carrying a coolant.

7. The data transmission cable of claim 6, wherein the coolant comprises liquid nitrogen.

8. The data transmission cable of claim 1, wherein the optical core comprises at least one bundle of topological insulator microfibers.

9. The data transmission cable of claim 8, wherein the at least one bundle comprise a plurality of topological insulator microfiber elements.

10. The data transmission cable of claim 9, wherein at least one of the plurality of topological insulator microfiber elements comprises one of antimony, bismuth selenide, and bismuth telluride.

11. The data transmission cable of claim 9, wherein the at least one bundle further comprises a core of insulating flexible cold resistant plastic within which the topological insulator microfibers are embedded.

12. A long-range data transmission cable, comprising:
an optical core made from topological insulator microfiber; and
at least one heat exchange layer surrounding the optical core to provide a cryogenic environment for the optical core, wherein the at least one heat exchange layer comprises an insulation layer including at least one photonic crystal bead.

13. The long-range data transmission cable of claim 12, wherein the at least one heat exchange layer comprises a coolant layer.

14. The long-range data transmission cable of claim 13, wherein the coolant layer comprises at least one tube containing a coolant that is in thermodynamic communication with the optical core.

15. The long-range data transmission cable of claim 14, wherein the coolant comprises liquid nitrogen.

16. The long-range data transmission cable of claim 12, wherein the insulation layer comprises a photonic crystal layer.

17. The long-range data transmission cable of claim 16, wherein the photonic crystal layer comprises a plurality of photonic crystal spheres.

18. The data transmission cable of claim 1, wherein at least one of the photonic crystal beads comprises a photonic crystal sphere with a Fluoropolyme coating.

19. The data transmission cable of claim 1, wherein the photonic crystal beads comprise spherical and non-spherical shapes.

20. The long range data transmission cable of claim 12, wherein the insulation layer contains a plurality of spherical photonic crystal beads and a plurality of non-spherical photonic crystal beads.

* * * * *